(12) United States Patent
Kojima

(10) Patent No.: US 9,719,575 B2
(45) Date of Patent: Aug. 1, 2017

(54) VIBRATION-DAMPING DEVICE

(71) Applicant: BRIDGESTONE CORPORATION, Tokyo (JP)

(72) Inventor: Hiroshi Kojima, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 15/022,023

(22) PCT Filed: Sep. 3, 2014

(86) PCT No.: PCT/JP2014/073202
§ 371 (c)(1),
(2) Date: Mar. 15, 2016

(87) PCT Pub. No.: WO2015/041056
PCT Pub. Date: Mar. 26, 2015

(65) Prior Publication Data
US 2016/0223048 A1     Aug. 4, 2016

(30) Foreign Application Priority Data

Sep. 20, 2013 (JP) ................................. 2013-195974

(51) Int. Cl.
*F16F 13/10* (2006.01)
*F16F 13/18* (2006.01)
(Continued)

(52) U.S. Cl.
CPC ............ *F16F 13/10* (2013.01); *B60K 5/1208* (2013.01); *F16F 13/18* (2013.01); *F16F 13/268* (2013.01)

(58) Field of Classification Search
CPC .......... F16F 13/10; F16F 13/18; F16F 13/268; B60K 5/1208
(Continued)

(56) References Cited

U.S. PATENT DOCUMENTS 5,370,375 A  * 12/1994 Kojima ................. F16F 13/262
                                                                267/140.14
5,499,799 A  *  3/1996 Kojima ................. F16F 13/107
                                                                267/140.13
(Continued)

FOREIGN PATENT DOCUMENTS

CN          103161875 A      6/2013
JP            5-44767 A      2/1993
(Continued)

OTHER PUBLICATIONS

International Search Report of PCT/JP2014/073202, dated Oct. 21, 2014. [PCT/ISA/210].
(Continued)

*Primary Examiner* — Thomas J Williams
*Assistant Examiner* — Mariano Sy
(74) *Attorney, Agent, or Firm* — Sughrue Mion, PLLC

(57) ABSTRACT

A vibration-damping device (10) of the invention includes a tubular first attachment member (11) and a second attachment member (12); an elastic body (13); a partitioning member (17) that forms a main liquid chamber (14), a first auxiliary liquid chamber (15), and a second auxiliary liquid chamber (16); a first diaphragm (18) that constitutes a portion of the wall surface of the first auxiliary liquid chamber (15); and a second diaphragm (19) that constitutes a portion of the wall surface of the second auxiliary liquid chamber (16) and that has a smaller deformation resistance than the deformation resistance of the first diaphragm (18). The partitioning member (17) is provided with an idle orifice (31) that allows the main liquid chamber (14) and the first auxiliary liquid chamber (15) to communicate with each other and that produces resonance with respect to the input of an idle vibration, and a shake orifice (32) that allows the main liquid chamber (14) and the second auxiliary liquid chamber (16) to communicate with each other and that
(Continued)

produces resonance with respect to the input of a shake vibration. An adjustment chamber (24) having an interior capable of being decompressed or compressed with respect to standard pressure or being open so as to be capable of being blocked with respect to the outside, is provided adjacent to the second auxiliary liquid chamber (16) with the second diaphragm (19) interposed therebetween. By including the configuration as described above, damping characteristics against vibrations are exhibited over a wide range of frequencies.

2 Claims, 2 Drawing Sheets

(51) Int. Cl.
*F16F 13/26* (2006.01)
*B60K 5/12* (2006.01)

(58) Field of Classification Search
USPC .............................. 267/140.11–140.15, 219
See application file for complete search history.

(56) References Cited

U.S. PATENT DOCUMENTS

| | | | | |
|---|---|---|---|---|
| 6,073,918 | A * | 6/2000 | Kojima | F16F 13/262 267/140.14 |
| 6,176,477 | B1 * | 1/2001 | Takeo | F16F 13/105 267/140.11 |
| 6,257,562 | B1 * | 7/2001 | Takashima | F16F 13/105 267/140.13 |
| 7,052,003 | B2 * | 5/2006 | Ueki | F16F 13/26 267/140.13 |
| 2002/0005607 | A1 | 1/2002 | Muramatsu et al. | |
| 2002/0140143 | A1 * | 10/2002 | Yamamoto | F16F 13/106 267/140.13 |
| 2002/0149144 | A1 * | 10/2002 | Takashima | F16F 13/264 267/140.13 |
| 2002/0158388 | A1 | 10/2002 | Itoh et al. | |
| 2005/0127586 | A1 | 6/2005 | Maeno et al. | |
| 2006/0249891 | A1 * | 11/2006 | Ueki | F16F 13/105 267/140.13 |
| 2009/0008195 | A1 * | 1/2009 | Ueki | F16F 13/105 188/282.6 |
| 2010/0102492 | A1 * | 4/2010 | Lee | F16F 13/26 267/121 |
| 2012/0292838 | A1 * | 11/2012 | Yamamoto | F16F 13/106 267/140.13 |
| 2012/0313306 | A1 * | 12/2012 | Ueki | F16F 13/107 267/140.11 |
| 2013/0154171 | A1 | 6/2013 | Nishi et al. | |

FOREIGN PATENT DOCUMENTS

| | | |
|---|---|---|
| JP | 6-78644 U | 11/1994 |
| JP | 2005-76797 A | 3/2005 |
| JP | 2006-161962 A | 6/2006 |
| JP | 2012-172832 A | 9/2012 |

OTHER PUBLICATIONS

Written Opinion of PCT/JP2014/073202, dated Oct. 21, 2014. [PCT/ISA/237].

* cited by examiner

VIBRATION-DAMPING DEVICE

CROSS REFERENCE TO RELATED APPLICATIONS

This application is a National Stage of International Application No. PCT/JP2014/073202 filed Sep. 3, 2014, claiming priority based on Japanese Patent Application No. 2013-195974, filed Sep. 20, 2013, the contents of all of which are incorporated herein by reference in their entirety.

TECHNICAL FIELD

The present invention relates to a vibration-damping device that is applied to, for example, automobiles, industrial machines, or the like, and absorbs and damps vibrations of vibration generating parts, such as engines.

BACKGROUND ART

In the related art, for example, a vibration-damping device described in the following Patent Document 1 is known. This vibration-damping device includes a tubular first attachment member that is coupled to any one of a vibration generating part and a vibration receiving part, a second attachment member that is coupled to the other thereof, an elastic body that couples both the attachment members, a main liquid chamber that is fitted into the first attachment member and has the elastic body as a portion of the wall surface thereof, and a partitioning member that forms an auxiliary liquid chamber provided independently from the main liquid chamber. Since the partitioning member is provided with a limiting path that allows the main liquid chamber and the auxiliary liquid chamber to communicate with each other, when a vibration with a frequency equal to the resonant frequency of the limiting path is input to this vibration-damping device, this vibration is absorbed and damped.

CITATION LIST

Patent Document

[Patent Document 1] Japanese Unexamined Patent Application, First Publication No. 2012-172832

SUMMARY OF INVENTION

Technical Problem

However, in the related-art vibration-damping device, there is room for improvement with respect to exhibiting damping characteristics against vibrations over a wide range of frequencies.

The invention has been made in view of the aforementioned circumstances, and an object thereof is to provide a vibration-damping device that can exhibit damping characteristics against vibrations over a wide range of frequencies.

Solution to Problem

In order to solve the above problems, the invention suggests the following means.

A vibration-damping device related to the invention includes a tubular first attachment member coupled to any one of a vibration generating part and a vibration receiving part, and a second attachment member coupled to the other thereof; an elastic body coupling both of the attachment members; a partitioning member that is fitted into the first attachment member and forms a main liquid chamber having the elastic body as a portion of the wall surface thereof, and a first auxiliary liquid chamber and a second auxiliary liquid chamber provided independently from the main liquid chamber; a first diaphragm that constitutes a portion of the wall surface of the first auxiliary liquid chamber; and a second diaphragm that constitutes a portion of the wall surface of the second auxiliary liquid chamber and that has a smaller deformation resistance than the deformation resistance of the first diaphragm. The partitioning member is provided with an idle orifice that allows the main liquid chamber and the first auxiliary liquid chamber to communicate with each other and that produces resonance with respect to the input of an idle vibration, and a shake orifice that allows the main liquid chamber and the second auxiliary liquid chamber to communicate with each other and that produces resonance with respect to the input of a shake vibration. An adjustment chamber having an interior capable of being decompressed or compressed with respect to standard pressure or being open so as to be capable of being blocked with respect to the outside, is provided adjacent to the second auxiliary liquid chamber with the second diaphragm interposed therebetween.

In this invention, the shake orifice produces resonance with respect to a shake vibration while the idle orifice produces resonance with respect to the input of an idle vibration. Therefore, the flow resistance of the shake orifice becomes larger than the flow resistance of the idle orifice.

Meanwhile, if a vibration is input to the vibration-damping device in a standard state where the interior of the adjustment chamber is brought to standard pressure or the vibration-damping device in a standard state where the interior of the adjustment chamber is made open to the outside, a liquid tends to flow through the idle orifice, deforming the first diaphragm between the main liquid chamber and the first auxiliary liquid chamber, or a liquid tends to flow through the shake orifice, deforming the second diaphragm between the main liquid chamber and the second auxiliary liquid chamber. Here, since the deformation resistance of the second diaphragm is smaller than the deformation resistance of the first diaphragm, it can be made it difficult for a liquid to flow between the main liquid chamber and the first auxiliary liquid chamber and it can be made it easy for a liquid to flow between the main liquid chamber and the second auxiliary liquid chamber. Therefore, as mentioned above, even if the flow resistance of the shake orifice is larger than the flow resistance of the idle orifice, a liquid can be preferentially circulated to the shake orifice rather than to the idle orifice.

As a result, when a shake vibration is input to the vibration-damping device in a standard state, it is possible to preferentially circulate the liquid within the main liquid chamber through the shake orifice between the main liquid chamber and the second auxiliary liquid chamber, and the shake vibration can be absorbed and damped by producing resonance in the shake orifice.

On the other hand, if the vibration-damping device is brought into an adjusted state where the interior of the adjustment chamber is decompressed or compressed to standard pressure, or an adjusted state where the interior of the adjustment chamber is blocked with respect to the outside, compared with a case where the vibration-damping device is in a standard state, the second diaphragm can be constrained and the deformation resistance of the second diaphragm can be increased. Accordingly, it can be make it difficult for a liquid to circulate between the main liquid chamber and the second auxiliary liquid chamber and it can be made it easy for a liquid to circulate between the main liquid chamber and the first auxiliary liquid chamber. As a result, the liquid can be preferentially circulated not through the shake orifice but through the idle orifice.

As a result, when an idle vibration is input to the vibration-damping device in the adjusted state, it is possible to preferentially circulate the liquid within the main liquid chamber through the idle orifice between the main liquid chamber and the first auxiliary liquid chamber, and the idle vibration can be absorbed and damped by producing resonance in the idle orifice.

According to the vibration-damping device, by switching between the standard state and the adjusted state, it is possible to absorb and damp a shake vibration and an idle vibration, respectively, and damping characteristics against vibrations can be exhibited over a wide range of frequencies.

Additionally, in the above vibration-damping device, the partitioning member may be provided with a lock-up orifice that extends from the main liquid chamber toward the second auxiliary liquid chamber and that produces resonance with respect to the input of a lock-up vibration, a housing chamber that allows the lock-up orifice and the second auxiliary liquid chamber to communicate with each other, and a movable object that is housed within the housing chamber so as to be displaceable in an axial direction of the first attachment member, and the movable object may be housed within the housing chamber so as to be displaceable in the axial direction so as to allow the lock-up orifice and the second auxiliary liquid chamber to communicate with each other through the housing chamber at the time of the input of the lock-up vibration and cut off the communication therebetween at the time of the input of the shake vibration.

In this case, when a shake vibration is input to the vibration-damping device in a standard state, the movable object is displaced in the axial direction, and the communication between the lock-up orifice and the second auxiliary liquid chamber through the housing chamber is cut off. Therefore, it is possible to circulate the liquid within the main liquid chamber through the shake orifice between the main liquid chamber and the second auxiliary liquid chamber, and the shake vibration can be absorbed and damped by producing resonance in the shake orifice.

Meanwhile, since the lock-up orifice produces resonance with respect to a lock-up vibration, the flow resistance of the lock-up orifice becomes smaller than the flow resistance of each of the idle orifice and the shake orifice. Therefore, a liquid can be preferentially circulated to the lock-up orifice compared with the idle orifice or the shake orifice.

As a result, when a lock-up vibration is input to the vibration-damping device in a standard state, it is possible to preferentially circulate the liquid through the lock-up orifice between the main liquid chamber and the second auxiliary liquid chamber, and the lock-up vibration can be absorbed and damped by producing resonance in the lock-up orifice.

According to this vibration-damping device, in the standard state, it is possible to absorb and damp a shake vibration and a lock-up vibration, and damping characteristics against vibrations can be exhibited over a wider range of frequencies.

Advantageous Effects of Invention

According to the vibration-damping device related to the invention, damping characteristics against vibration can be exhibited over a wide range of frequencies.

DESCRIPTION OF EMBODIMENTS

A vibration-damping device related to an embodiment of the invention will be described below with reference to the drawings.

Figure 1:
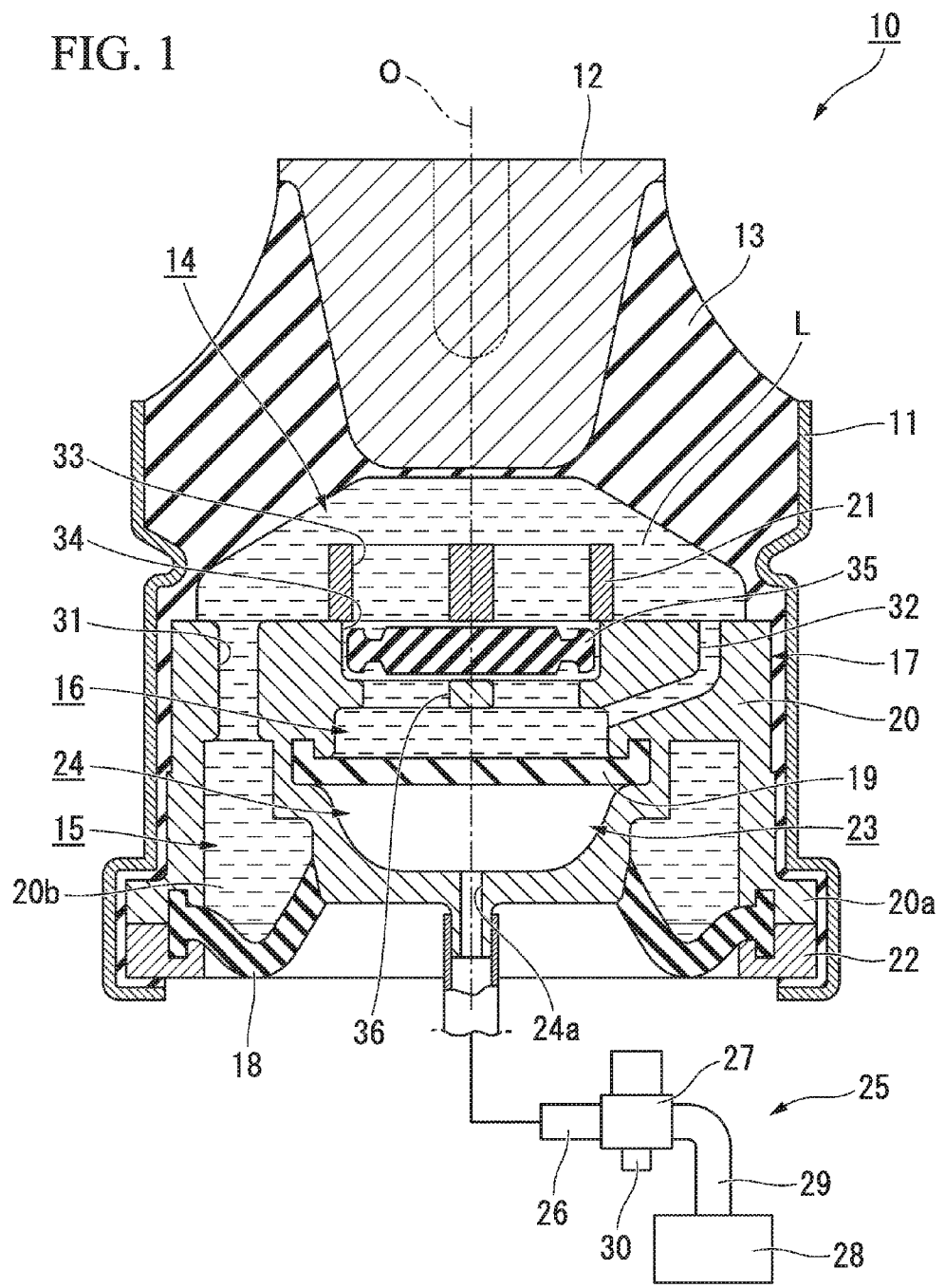
FIG. 1 is a longitudinal sectional view illustrating the standard state of a vibration-damping device related to an embodiment of the invention.

As illustrated in FIG. 1, a vibration-damping device 10 includes a tubular first attachment member 11 that is coupled to any one of a vibration generating part and a vibration receiving part, a second attachment member 12 that is coupled to the other thereof, an elastic body 13 that elastically couples the first attachment member 11 and the second attachment member 12, a partitioning member 17 that is fitted into the first attachment member 11 and forms a main liquid chamber 14 having the elastic body 13 as a portion of the wall surface thereof, and a first auxiliary liquid chamber 15 and a second auxiliary liquid chamber 16 that are provided independently from the main liquid chamber 14, a first diaphragm 18 that constitutes a portion of the wall surface of the first auxiliary liquid chamber 15, and a second diaphragm 19 that constitutes a portion of the wall surface of the second auxiliary liquid chamber 16.

In a case where this liquid-enclosed type vibration-damping device 10 is mounted on, for example, an automobile, the second attachment member 12 is coupled to an engine serving as the vibration generating part and the first attachment member 11 is coupled to a vehicle body serving as the vibration receiving part, whereby vibration of the engine is restrained from being transmitted to the vehicle body. In the vibration-damping device 10, a positive pressure is applied to the main liquid chamber 14 the basis of a support load at the time of mounting.

The first attachment member 11 is formed in a cylindrical shape, in the illustrated example, in a multi-stage cylindrical shape. In the following, a direction along an axis O of the first attachment member 11 is referred to as an axial direction, a direction orthogonal to the axis O is referred to as a radial direction, and a direction going around the axis O is referred to as a circumferential direction.

The second attachment member 12 is disposed on one end of the first attachment member 11 located on one side (hereinafter referred to as "one side") along the axial direction. The second attachment member 12 is formed in a columnar shape arranged coaxially with the axis O.

The elastic body 13 is bonded to an inner peripheral surface of the one end of the first attachment member 11 and an outer peripheral surface of the second attachment member 12, respectively, and blocks the one end of the first attachment member 11.

The partitioning member 17 includes a body member 20 and a flow passage member 21. The body member 20 is arranged coaxially with the axis O, and is liquid-tightly fitted into within the portion of the first attachment member 11 located closer to the other side (hereinafter referred to as "other side") along the axial direction than the one end. An annular flange part 20a that protrudes toward a radial outer side is provided at the end of the body member 20 located on the other side. The flow passage member 21 is arranged coaxially with the axis O, and is assembled into the body member from one side.

The main liquid chamber 14 is formed in a portion located between the elastic body 13 and the partitioning member 17 within the first attachment member 11. The liquid pressure of the main liquid chamber 14 fluctuates when the elastic body 13 is deformed and the intern al volume of the main liquid chamber 14 varies at the time of the input of vibration.

The first auxiliary liquid chamber 15 is separated from the main liquid chamber 14 to the other side and is formed in an annular shape coaxially with the axis O. In the present embodiment, in the first auxiliary liquid chamber 15, a liquid chamber recess 20b that is formed in the body member 20 and opens toward the other side is blocked by the first diaphragm 18, and is expanded and contracted when the first diaphragm 18 is deformed.

The first diaphragm 18 is formed in the shape of an elastically deformable diaphragm. The first diaphragm 18 is formed in an annular shape coaxially with the axis O, and blocks the liquid chamber recess 20b from the other side. An inner peripheral edge and an outer peripheral edge of the first diaphragm 18 are fixed to the body member 20. The inner peripheral edge of the first diaphragm 18 is vulcanized and bonded to the portion of the body member 20 located closer to a radial inner side than the liquid chamber recess 20b. The outer peripheral edge of the first diaphragm 18 is fixed to the flange part 20a of the body member 20, and in the illustrated example, is sandwiched between the flange part 20a, and a stop ring 22 overlapping the flange part 20a from the other side.

The second auxiliary liquid chamber 16 is separated from the main liquid chamber 14 to the other side and is arranged coaxially with the axis O. In the present embodiment, the second auxiliary liquid chamber 16 is formed within the partitioning member 17, and an inner space 23 formed within the body member 20 is partitioned by the second diaphragm 19. The second auxiliary liquid chamber 16 is expanded and contracted when the second diaphragm 19 is deformed.

The inner space 23 is formed in the portion of the body member 20 located closer to the radial inner side than the liquid chamber recess 20b. The second diaphragm 19 is arranged at a central part of the inner space 23 in the axial direction, and partitions the inner space 23 in the axial direction. The outer peripheral edge of the second diaphragm 19 is liquid-tightly fixed to an inner peripheral surface of the inner space 23 over the whole circumference in the circumferential direction. The portion of the inner spaces 23 located closer to one side than the second diaphragm 19 is used as the second auxiliary liquid chamber 16, and the portion thereof located on the other side is used as an adjustment chamber 24 that has air (fluid) contained therein.

The adjustment chamber 24 is adjacent to the second auxiliary liquid chamber 16, with the second diaphragm 19 interposed therebetween.

The adjustment chamber 24 is separated from the main liquid chamber 14 to the other side, is formed within the partitioning member 17, and is arranged coaxially with the axis O. The adjustment chamber 24 is formed in the shape of an inverted truncated cone of which the diameter is reduced gradually from, one side toward the other side. A portion that connects a peripheral wall surface and a bottom wall surface of the adjustment chamber 24 is formed in the shape of a concavely curved surface that is recessed toward the other side. In addition, the volume of the adjustment chamber 24 is smaller than the volume of the main liquid chamber 14 and the first auxiliary liquid chamber 15, and it is preferable that the volume of adjustment chamber is equal to or less than $\frac{1}{5}$ of the volume of the main liquid chamber 14. For example, in the present embodiment, the volume of the adjustment chamber 24 is about $\frac{1}{10}$ of the volume of the main liquid chamber 14.

The interior of the adjustment chamber 24 is capable of being decompressed with respect to standard pressure. A connection hole 24a to which an adjusting mechanism 25 provided outside the vibration-damping device 10 is connected opens in the bottom wall surface of the adjustment chamber 24. The adjusting mechanism 25 includes a switching valve 27 connected to the connection hole 24a via a connection pipe 26, and a control unit (not illustrated) that controls the switching valve 27.

The switching valve 27 is formed by, for example, an electromagnetic valve or the like. For example, a negative pressure pipe 29 connected to a negative pressure sources 28, such as an intake manifold of an engine, an atmospheric pressure pipe 30 that opens to the atmospheric air are connected to the switching valve 27. The switching valve 27 switches a pipe to be connected to the connection pipe 26 to the negative pressure pipe 29 and the atmospheric pressure pipe 30. The above control unit controls the switching valve 27, for example, on the basis of the operating conditions of the vibration generating part or the like.

Here, the partitioning member 17 is provided with an idle orifice 31, a shake orifice 32, a lock-up orifice 33, a housing chamber 34, and a movable object 35.

The idle orifice 31 allows the main liquid chamber 14 and the first auxiliary liquid chamber 15 to communicate with each other. The idle orifice 31 is formed in the body member 20 of the partitioning member 17, is arranged avoiding the axis O, and extends in the axial direction. The resonant frequency of the idle orifice 31 is equal to the frequency of an idle vibration (for example, a frequency of 15 Hz to 40 Hz and an amplitude of ±0.5 mm or less), and the idle orifice 31 produces resonance (liquid column resonance) with respect to the input of the idle vibration.

The shake orifice 32 allows the main liquid chamber 14 and the second auxiliary liquid chamber 16 to communicate with each other. The shake orifice 32 is formed in the body member 20 of the partitioning member 17, is arranged avoiding the axis O, and extends in the axial direction. The resonant frequency of the shake orifice 32 is equal to the frequency of a shake vibration (for example, a frequency of 14 Hz or less and an amplitude of greater than ±0.5 mm), and the shake orifice 32 produces resonance (liquid column resonance) with respect to the input of the shake vibration.

The lock-up orifice 33 extends from the main liquid chamber 14 toward the second auxiliary liquid chamber 16.

The lock-up orifice 33 is formed in the flow passage member 21 of the partitioning member 17 and passes through the flow passage member 21 in the axial direction. A plurality of the lock-up orifices 33 are arranged avoiding the axis O and are provided in the flow passage member 21 at intervals in the circumferential direction. The resonant frequency of the lock-up orifices 33 is equal to the frequency of a lock-up vibration (for example, a frequency of about 80 Hz), and the lock-up orifices 33 produce resonance (liquid column resonance) with respect to the input of the lock-up vibration.

Here, the flow resistance of the lock-up orifices 33 is smaller than flow resistance of the idle orifice 31, and the flow resistance of the shake orifice 32 is greater than the flow resistance of the idle orifice 31. In addition, the flow resistances of the respective orifices are determined, for example, on the basis of flow passage lengths, flow passage cross-sectional areas, or the like of the respective orifices.

The housing chamber 34 allows the lock-up orifices 33 and the second auxiliary liquid chamber 16 to communicate with each other. The housing chamber 34 is arranged at the portion of the partitioning member 17 sandwiched in the axial direction between the lock-up orifices 33 and the second auxiliary liquid chamber 16. The housing chamber 34 is arranged coaxially with the axis O. The housing chamber 34 is formed by a recess that opens toward one side of the body member 20 of the partitioning member 17. A communication hole 36 that opens toward the second auxiliary liquid chamber 16 is formed in a bottom wall surface of the housing chamber 34. A plurality of the communication holes 36 are provided so as to be formed at respective positions that face the lock-up orifices 33 in the axial direction in the bottom wall surface of the housing chamber 34.

The movable object 35 is arranged between the lock-up orifices 33 and the second auxiliary liquid chamber 16. The movable object 35 is formed of, for example, a rubber material or the like so as to be elastically deformable, and is formed in the shape of a plate of which the front and back surfaces face the axial direction. The movable object 35 is a so-called rattling membrane that is housed in the housing chamber 34 so as to be displaceable in the axial direction. The aspect of the axial displacement of the movable object 35 differs according to the frequencies of vibrations to be input. The movable object 35 is displaced in the axial direction relative to the partitioning member 17 so that the main liquid chamber 14 and the second auxiliary liquid chamber 16 are allowed to communicate with each other through the housing chamber 34 at the time of the input of a lock-up vibration, and so that the communication between the main liquid chamber 14 and the second auxiliary liquid chamber 16 through the housing chamber 34 is cut off at the time of the input of a shake vibration.

The movable object 35 may be alternately displaced to both sides in the axial direction, for example, in a state where the movable object is separated from the inner surface of the housing chamber 34 when the main liquid chamber 14 and the second auxiliary liquid chamber 16 are allowed to communicate with each other through the housing chamber 34. Additionally, the movable object 35 may, for example alternately block, the lock-up orifices 33 and the communication holes 36 or may continue blocking any one of the lock-up orifices 33 and the communication holes 36, when the communication between the main liquid chamber 14 and the second auxiliary liquid chamber 16 through the housing chamber 34 is cut off.

In the vibration-damping device 10, the deformation resistance of the second diaphragm 19 is smaller than the deformation resistance of the first diaphragm 18. In addition, the deformation resistance of the first diaphragm 18 or the second diaphragm 19 can be adjusted by appropriately changing the bending rigidity of respective members, the amounts of volume change per unit load in the respective members, or the like, for example, on the basis of the Young's moduli of materials that form the respective members, the thicknesses of the respective members, or the like.

The vibration-damping device 10 is a liquid-enclosed type in which, for example, a liquid, such as ethylene glycol, water, or silicone oil, is enclosed. The main liquid chamber 14, the first auxiliary liquid chamber 15, the second auxiliary liquid chamber 16, the idle orifice 31, the shake orifice 32, the lock-up orifices 33, the housing chamber 34, and the communication holes 36 in the vibration-damping device 10 are filled with the above liquid.

Next, the operation of the vibration-damping device 10 will be described.

When the vibration-damping device 10 is arranged between the vibration generating part and the vibration receiving part, an initial load that displaces the second attachment member 12 toward the other side with respect to the first attachment member 11 is applied to the vibration-damping device 10, the main liquid chamber 14 is contracted, and the liquid pressure of the main liquid chamber 14 is fluctuated and raised. Here, in the vibration-damping device 10, the deformation resistance of the second diaphragm 19 is smaller than the deformation resistance of the first diaphragm 18. Thus, the liquid pushed out from the main liquid chamber 14 in this case flows into the second auxiliary liquid chamber 16 that has the second diaphragm 19 as a portion of the wall surface thereof.

Figure 2:
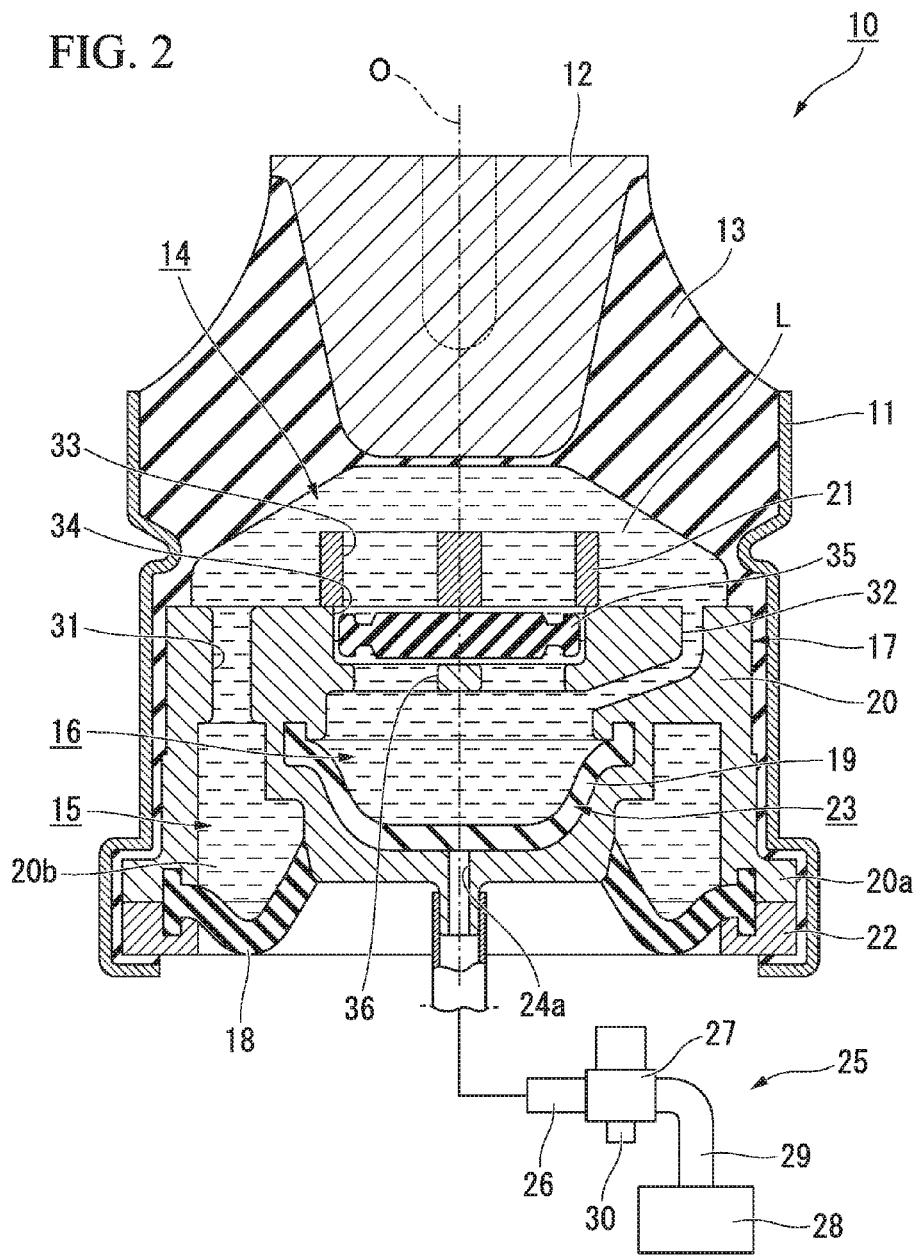
FIG. 2 is a longitudinal sectional view illustrating the adjusted state of the vibration-damping device illustrated in FIG. 1.

Moreover, the vibration-damping device 10 is switched to the standard state where the internal pressure of the adjustment chamber 24 as illustrated in FIG. 1 is brought into standard pressure and the adjusted state where the internal pressure of the adjustment chamber 24 as illustrates in FIG. 2 is reduced with respect to standard pressure, when the above control unit of the adjusting mechanism 25 controls the switching valve 27. In the vibration-damping device 10 in the adjusted state, as the interior of the adjustment chamber 24 is decompressed, the second diaphragm 19 is brought into close contact with the peripheral wall surface and the bottom wall surface of the adjustment chamber 24, the adjustment chamber 24 is contracted and disappears, and the second auxiliary liquid chamber 16 is expanded. If the decompression of the interior of the adjustment chamber 24 is released, the second diaphragm 19 is restored and deformed, and the adjustment chamber 24 is restored to standard pressure.

For example, in a case where the vibration-damping device 10 is applied to an automobile, the above control unit can control the switching valve 27, on the basis of the number of rotations of an engine serving as the vibration generating part or vehicle speed. Moreover, in this case, the control unit connects the connection pipe 26 and the atmospheric pressure pipe 30 by the switching valve 27, and brings the internal pressure of the adjustment chamber 24 into the atmospheric pressure as standard pressure, when an automobile is in a traveling state. Moreover, the control unit connects the connection pipe 26 and the negative pressure pipe 29 by the switching valve 27, and reduces the internal pressure of the adjustment chamber 24, when the automobile is in an idle state. In addition, in a case where an intake manifold is applied as the negative pressure source 28, the interior of the adjustment chamber 24 can be decompressed using an intake negative pressure generated in the intake manifold.

If a vibration is input to the vibration-damping device 10 of standard state as illustrated in FIG. 1 in the axial direction, both the attachment members 11 and 12 are displaced relative to each other in the axial direction, elastically deforming the elastic body 13, and the liquid pressure of the main liquid chamber 14 fluctuates. Then, a liquid tends to flow through the idle orifice 31, deforming the first diaphragm 18 between the main liquid chamber 14 and the first, auxiliary liquid chamber 15, or tends to flow through the shake orifice 32 or the lock-up orifices 33, deforming the second diaphragm 19 between the main liquid chamber 14 and the second auxiliary liquid chamber 16.

Here, in the vibration-damping device 10, as mentioned above, the deformation resistance of the second diaphragm 19 is smaller than the deformation resistance of the first diaphragm 18. Thus, it can be made it difficult for a liquid to flow between the main liquid chamber 14 and the first auxiliary liquid chamber 15 and it can be made it easy for a liquid to flow between the main liquid chamber 14 and the second auxiliary liquid chamber 16. Therefore, as in the present embodiment, even if the flow resistance of the shake orifice 32 is larger than the flow resistance of the idle orifice 31, a liquid can be preferentially circulated to the shake orifice 32 rather than to the idle orifice 31.

As a result, when a shake vibration is input to the vibration-damping device 10, a liquid within the main liquid chamber 14 tends to preferentially flow through the shake orifice 32 or the lock-up orifices 33 between the main liquid chamber 14 and the second auxiliary liquid chamber 16. In this case, the movable object 35 is displaced in the axial direction, and the communication between the lock-up orifices 33 and the second auxiliary liquid chamber 16 through the housing chamber 34 is cut off. Therefore, it is possible to circulate the liquid within the main liquid chamber 14 not through the lock-up orifices 33 but through the shake orifice 32 between the main liquid chamber 14 and the second auxiliary liquid chamber 16, and the shake vibration can be absorbed and damped by producing, resonance in the shake orifice 32.

Additionally, in the vibration-damping device 10, the flow resistance of the lock-up orifices 33 is smaller than the flow resistance of the shake orifice 32. Therefore, when a lock-up vibration is input to the vibration-damping device 10 in a standard state, it is possible to preferentially circulate a liquid through the lock-up orifices 33 between the main liquid chamber 14 and the second auxiliary liquid chamber 16. As a result, the lock-up vibration can be absorbed and damped by producing resonance in the lock-up orifices 33, and for example, suppressing a rise in the dynamic spring constant of the vibration-damping device 10.

On the other hand, as illustrated in FIG. 2, if the vibration-damping device 10 is brought into the adjusted state where the interior of the adjustment chamber 24 is decompressed to standard pressure, compared with a case where the vibration-damping device 10 is in a standard state, the second diaphragm 19 can be constrained and the deformation resistance of the second diaphragm 19 can be enlarged. Accordingly, it can be made it difficult for a liquid to circulate between the main liquid chamber 14 and the second auxiliary liquid chamber 16 and it can be made it easy for a liquid to circulate between the main liquid chamber 14 and the first auxiliary liquid chamber 15. As a result, the liquid can be preferentially circulated not through the shake orifice 32 or the lock-up orifices 33 but through the idle orifice 31.

As a result, when an idle vibration is input to the vibration-damping device 10 in the adjusted state, it is possible to preferentially circulate the liquid within the main liquid chamber 14 through the idle orifice 31 between the main liquid chamber 14 and the first auxiliary liquid chamber 15. As a result, the idle vibration can be absorbed and damped by producing resonance in the idle orifice 31, and for example, suppressing a rise in the dynamic spring constant of the vibration-damping device 10.

As described above, according to the vibration-damping device 10 related to the present embodiment, by switching between the standard state and the adjusted state, it is possible to absorb and damp a shake vibration and an idle vibration, respectively, and damping characteristics against vibrations can be exhibited over a wide range of frequencies.

Additionally, in the standard state, it is possible to absorb and damp a shake vibration and a lock-up vibration, and damping characteristics against vibrations can be exhibited over a wider range of frequencies.

The technical scope of the invention is not limited to the above embodiment, and various changes can be made without departing from the concept of the invention.

In the above embodiment, the interior of the adjustment chamber 24 is capable of being decompressed with respect to standard pressure. However, the invention is not limited to this.

For example, in a first modification example of the invention, the interior of the adjustment chamber may be made capable of being compressed with respect to standard pressure, and the adjusted state of the vibration-damping device may be brought into a state where the interior of the adjustment chamber is compressed with respect to standard pressure and the second diaphragm is constrained. In this case, for example, a pressure source or the like can be adopted instead of the above negative pressure source.

Moreover, for example, in a second modification example of the invention, the interior of the adjustment chamber may be made open so as to be capable of being blocked with respect to the outside, the standard state of the vibration-damping device may be brought into a state where the interior of the adjustment chamber is made open to the outside, and the adjusted state of the vibration-damping device may be brought into a state where the interior of the adjustment chamber is blocked with respect to the outside. In this case, in the vibration-damping device in the adjusted state, the second diaphragm can be constrained by using the pressure within the adjustment chamber as a back pressure. In addition, in this configuration, an opening and closing valve that opens and closes the interior of the adjustment chamber with respect to the outside of the vibration-damping device may be adopted instead of the above switching valve. Moreover, an opening and closing mechanism that directly opens and closes the connection hole may be adopted instead of the switching valve and the connection pipe.

Moreover, the lock-up orifices 33, the housing chamber 34, the movable object 35, and the communication holes 36 may not be provided.

In addition, the constituent elements in the aforementioned embodiment can be appropriately substituted with well-known constituent elements without departing from the concept of the invention, and the aforementioned embodiment may be appropriately combined.

INDUSTRIAL APPLICABILITY

A vibration-damping device that can exhibit damping characteristics against vibrations over a wide range of frequencies can be provided.

REFERENCE SIGNS LIST

10: VIBRATION-DAMPING DEVICE
11: FIRST ATTACHMENT MEMBER
12: SECOND ATTACHMENT MEMBER
13: ELASTIC BODY
14: MAIN LIQUID CHAMBER
15: FIRST AUXILIARY LIQUID CHAMBER
16: SECOND AUXILIARY LIQUID CHAMBER
17: PARTITIONING MEMBER

18: FIRST DIAPHRAGM
19: SECOND DIAPHRAGM
24: ADJUSTMENT CHAMBER
31: IDLE ORIFICE
32: SHAKE ORIFICE
33: LOCK-UP ORIFICE
34: HOUSING CHAMBER
35: MOVABLE OBJECT

What is claimed is:

1. A vibration-damping device comprising:
a tubular first attachment member coupled to any one of a vibration generating part and a vibration receiving part, and a second attachment member coupled to the other of the vibration generating part and the vibration receiving part;
an elastic body coupling both of the attachment members;
a partitioning member that is fitted into the first attachment member and forms a main liquid chamber having the elastic body as a portion of a wall surface of the main liquid chamber, and a first auxiliary liquid chamber and a second auxiliary liquid chamber provided independently from the main liquid chamber;
a first diaphragm that constitutes a portion of a wall surface of the first auxiliary liquid chamber; and
a second diaphragm that constitutes a portion of a wall surface of the second auxiliary liquid chamber and that has a smaller deformation resistance than the deformation resistance of the first diaphragm,
wherein the partitioning member is provided with an idle orifice that allows the main liquid chamber and the first auxiliary liquid chamber to communicate with each other and that produces resonance with respect to the input of an idle vibration, and a shake orifice that allows the main liquid chamber and the second auxiliary liquid chamber to communicate with each other and that produces resonance with respect to the input of a shake vibration, and
wherein an adjustment chamber having an interior capable of being decompressed or compressed with respect to standard pressure or being open so as to be capable of being blocked with respect to the outside, is provided adjacent to the second auxiliary liquid chamber with the second diaphragm interposed therebetween.

2. The vibration-damping device according to claim 1,
wherein the partitioning member is provided with a lock-up orifice that extends from the main liquid chamber toward the second auxiliary liquid chamber and that produces resonance with respect to the input of a lock-up vibration, a housing chamber that allows the lock-up orifice and the second auxiliary liquid chamber to communicate with each other, and a movable object that is housed within the housing chamber so as to be displaceable in an axial direction of the first attachment member, and
wherein the movable object is housed within the housing chamber so as to be displaceable in the axial direction so as to allow the lock-up orifice and the second auxiliary liquid chamber to communicate with each other through the housing chamber at the time of the input of the lock-up vibration and cut off the communication therebetween at the time of the input of the shake vibration.

* * * * *